(12) United States Patent
Olson, III et al.

(10) Patent No.: US 7,976,963 B2
(45) Date of Patent: Jul. 12, 2011

(54) CONCRETE PRODUCT WITH ENHANCED ORNAMENTAL SURFACE LAYER

(75) Inventors: Rudolph A. Olson, III, Hendersonville, NC (US); Dwayne A. Johnson, Anderson, SC (US)

(73) Assignee: Boral Stone Products, LLC, Roswell, GA (US)

( * ) Notice: Subject to any disclaimer, the term of this patent is extended or adjusted under 35 U.S.C. 154(b) by 377 days.

(21) Appl. No.: 12/111,655

(22) Filed: Apr. 29, 2008

(65) Prior Publication Data

US 2009/0019800 A1  Jan. 22, 2009

Related U.S. Application Data

(60) Provisional application No. 60/927,068, filed on May 1, 2007.

(51) Int. Cl.
 *E04C 1/40* (2006.01)
 *E04C 2/06* (2006.01)
 *E04C 2/26* (2006.01)
 *C04B 40/00* (2006.01)
 *B28B 1/16* (2006.01)

(52) U.S. Cl. .......... 428/703; 264/256; 52/311.1; 52/596

(58) Field of Classification Search .................. None
 See application file for complete search history.

(56) References Cited

U.S. PATENT DOCUMENTS

| 2,143,004 | A |   | 1/1939  | Greager et al. |
| 3,563,786 | A |   | 2/1971  | Tse et al. |
| 4,019,297 | A |   | 4/1977  | Murphy |
| 4,235,948 | A |   | 11/1980 | Holmes |
| 4,877,656 | A |   | 10/1989 | Baskin |
| 5,199,986 | A |   | 4/1993  | Krockert et al. |
| 5,435,949 | A |   | 7/1995  | Hwang |
| 5,538,553 | A | * | 7/1996  | Burgand ................ 106/795 |
| 5,797,238 | A |   | 8/1998  | Berntsson et al. |
| 5,853,476 | A |   | 12/1998 | Will |
| 6,379,601 | B2 |  | 4/2002  | Bowe et al. |
| 6,790,544 | B2 |  | 9/2004  | Schmitz |
| 7,632,348 | B2 | * | 12/2009 | Cowan et al. .......... 106/724 |
| 2002/0048676 | A1 | * | 4/2002 | McDaniel et al. ......... 428/404 |
| 2002/0152711 | A1 | * | 10/2002 | Schmitz ..................... 52/612 |
| 2003/0172850 | A1 | * | 9/2003 | Chun et al. ............... 106/823 |
| 2004/0175514 | A1 |   | 9/2004 | Stiattesi |
| 2007/0027224 | A1 | * | 2/2007 | Cowan et al. ............ 521/56 |

FOREIGN PATENT DOCUMENTS

| DE | 199 44 307  |   | 3/2001  |
| GB | 2 376 904   |   | 12/2002 |
| JP | 58194961    |   | 11/1983 |
| JP | 58194961 A  |   | 11/1983 |
| WO | WO 02/070247 |  | 9/2002  |

OTHER PUBLICATIONS

International European Search Report EP 08 15 5504 dated Nov. 21, 2008.

* cited by examiner

*Primary Examiner* — Timothy M Speer
*Assistant Examiner* — Vera Katz
(74) *Attorney, Agent, or Firm* — Alston & Bird LLP

(57) ABSTRACT

A concrete product is provided having a body including an ornamental surface layer, an intermediate strengthening layer and a concrete substrate layer. The intermediate strengthening layer functions as a buffer between any air bubbles remaining in the concrete substrate layer and the ornamental facing layer following curing of the product.

18 Claims, 1 Drawing Sheet

CONCRETE PRODUCT WITH ENHANCED ORNAMENTAL SURFACE LAYER

TECHNICAL FIELD AND INDUSTRIAL APPLICABILITY OF THE INVENTION

This invention relates to the concrete product field and, more particularly, to a concrete product characterized by an ornamental surface layer with enhanced strength and appearance and a method for making such a concrete product.

BACKGROUND OF THE INVENTION

Concrete is currently utilized to make a number of building products including, but not limited to, manufactured stone veneer, cementitious siding and cementitious roofing tiles. U.S. Pat. No. 6,790,544 to Schmitz, U.S. Pat. No. 5,797,238 to Berntsson et al, U.S. Pat. No. 5,435,949 to Hwang, U.S. Pat. No. 4,877,656 to Baskin and U.S. Pat. No. 4,235,948 to Holmes and published U.S. Patent application 2004/0175514 to Stiattesi are all exemplary of state of the art concrete products and their methods of production.

In the past a manufactured stone veneer has been formed utilizing a mold having cavities with shapes simulating real stone. More specifically, the state of the art manufacturing process generally comprises painting the mold cavity with a pigmented slurry consisting of water, cement, certain iron oxides for color and a polymeric binder. Next, concrete is vibrated into the cavity over the pigmented slurry. The material is then allowed to cure and set before being removed from the mold. Upon removal, the product comprises a body consisting of an ornamental facing layer formed from the pigmented slurry and a concrete substrate layer formed from the concrete.

As the concrete is vibrated within the mold M, aggregate and cement paste migrate downward and air bubbles B are typically driven upward (see FIG. 1). It should be appreciated, however, that the concrete layer C includes a high viscosity, compacted aggregate that resists the upward movement of the air bubbles B. As a result, at times one or more air bubbles become trapped at the interface I between the pigmented slurry S and the concrete C. This results in a number of detrimental effects.

More specifically, the pigmented slurry and resulting ornamental surface layer are typically thin. Air bubbles underneath the surface along the interface between the two layers significantly weaken the ornamental surface layer. As a consequence, the surface layer may become damaged during removal of the product from the mold, during packing of the product for shipping, during shipping, during installation or even during handling at any time. Where the damage is severe, the product must be scrapped. Further, while less severe damage may not require scrapping of the product, it can adversely effect the service life and customer satisfaction with the product. More specifically, small air bubbles can lead to the formation of small holes in the ornamental surface layer. Such holes deleteriously affect the natural ornamental appearance of the product.

The present invention relates to a concrete product and a method for its production that substantially reduces or eliminates problems produced by air bubbles becoming trapped along the interface between the pigmented slurry and the concrete during production of concrete products. As a result, the concrete products of the current invention are produced without surface holes and have a more natural appearance.

SUMMARY OF THE INVENTION

In accordance with the purposes of the present invention as described herein, an improved concrete product is provided.

The concrete product comprises a body including (a) an ornamental surface layer, (b) an intermediate strengthening layer and (c) a concrete substrate layer. Generally the ornamental surface layer includes cement, a pigmenting agent, a polymeric binder and water. The intermediate strengthening layer includes a cementitious material, a pigmenting agent and a water reducer admixture comprising a hydroxylated carboxylic acid and a polycarboxylate plasticizer. The concrete substrate layer includes a material selected from a group consisting of white cement, gray cement and combinations thereof.

Both the ornamental surface layer and the intermediate strengthening layer include a pigmenting agent. The pigmenting agent may be selected from a number of known materials. Such pigmenting agents may be selected from a group of materials comprising manganese oxide, iron oxides, iron hydroxides, carbon, titanium dioxide, chromium oxide, zinc oxides, nickel or chromium rutiles, cobalt, copper, barium sulphate, barium manganate, or other known pigmenting agents as known to one skilled in the art, and combinations thereof. The polymeric binder of the ornamental surface layer may be selected from a group of materials comprising Alkyl benzene sulphonates, alkyl naphthalene sulphonates, lignin sulphonate, sulphated polyglycol ethers, melamine formaldehyde condensates, naphthalene formaldehyde condensates, gluconic acid, salts of low molecular weight, partially esterified styrene/maleic acid anhydride copolymers and copolymers of vinyl acetate, crotonic acid, or other binders known to one skilled in the art, and combinations thereof.

The cementitious material of the intermediate strengthening layer may be selected from a group of materials consisting of white cement, gray cement, fly ash and combinations thereof. The water reducer admixture typically includes hydroxylated carboxylic acid and polycarboxylate plasticizer. In addition, the intermediate strengthening layer typically includes silica sand and/or reinforcing fibers. The reinforcing fibers may be selected from a group of materials consisting of glass fibers (preferably AR glass), metal fibers, carbon fibers, natural fibers, polymer fibers (such as polyester, polypropylene, nylon, PVA or other polymer fibers), and combinations thereof. Further, the intermediate strengthening layer may include a waterproofing agent, which may be selected from a group of materials comprising calcium stearate, magnesium stearate, aluminum staearate, calcium myristate, calcium palmitate and calcium laurate or any other known waterproofing agent and combinations thereof. The intermediate strengthening layer typically has a viscosity of between about 2,300 to about 4,800 centipoise using a #4 Brookfield viscometer.

In accordance with still another aspect of the present invention, a method is provided for making a concrete product. The method comprises the steps of providing an ornamental surface layer in a product mold, adding a strengthening layer to the ornamental surface layer in the mold, adding a concrete substrate layer to the ornamental surface layer and the strengthening layer in the mold, allowing the ornamental surface layer, strengthening layer and concrete substrate layer to cure and removing the product from the mold.

In the following description there is shown and described a preferred embodiment of the invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain certain principles of the invention. In the drawing.

Reference will now be made in detail to the present preferred embodiment of the invention, an example of which is illustrated in the accompanying drawing.

DETAILED DESCRIPTION OF THE PREFERRED EMBODIMENTS OF THE INVENTION

Figure 3:
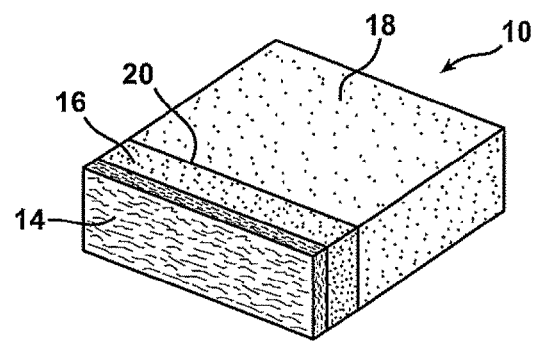
FIG. 3 is a perspective view of the cured and finished concrete product.

Reference is now made to FIG. 3 illustrating the concrete product 10 of the present invention. The illustrated concrete product is a manufactured cut stone. It should be appreciated, however, that the concrete product may assume substantially any other appropriate form including, but not limited to, a stone veneer plate, cementitious siding and cementitious roofing tiles.

In the illustrated embodiment the concrete product 10 includes a body 12. The body 12 includes three layers: an ornamental facing layer 14, an intermediate strengthening layer 16 and a concrete substrate layer 18.

The ornamental facing layer 14 is formed from a pigmented slurry comprising cement, a pigmenting agent, a polymeric binder and water. As described in U.S. Pat. Nos. 5,199,986 and 5,853,476, which are incorporated herein by reference in their entirety, the pigmenting agent may be selected from a number of known materials. Such pigmenting agents may be selected from a group of materials comprising manganese oxide, iron oxides, iron hydroxides, carbon, titanium dioxide, chromium oxide, zinc oxides, nickel or chromium rutiles, cobalt, copper, barium sulphate, barium manganate, or other known pigmenting agents as known to one skilled in the art, and combinations thereof. The polymeric binder of the ornamental surface layer may be selected from a group of materials comprising Alkyl benzene sulphonates, alkyl naphthalene sulphonates, lignin sulphonate, sulphated polyglycol ethers, melamine formaldehyde condensates, naphthalene formaldehyde condensates, gluconic acid, salts of low molecular weight, partially esterified styrene/maleic acid anhydride copolymers and copolymers of vinyl acetate, crotonic acid, or other binders known to one skilled in the art, and combinations thereof. Typically, the slurry from which the ornamental surface layer 14 is made includes cement, pigmenting agent, polymeric binder and water prior to curing.

The intermediate strengthening layer 16 is also made from a slurry including a cementitious material, a pigmenting agent, a water reducer admixture and water. Typically the cementitious material is selected from a group of materials consisting of white cement, gray cement, fly ash and combinations thereof. The pigmenting agent is selected from a group of materials as described above. Typically the pigmenting agent used in the intermediate strengthening layer 16 matches the pigmenting agent used in the ornamental facing layer 14. It is possible, however, for certain applications, that different pigmenting agents may be used in order to achieve special coloring effects.

The water reducer admixture typically incorporates a hydroxylated carboxylic acid and a polycarboxylate plasticizer. Exemplary water reducer admixtures include but are not limited to Sika 2100 High Range Water Reducer and Sika Plastiment Water Reducer and Retarder.

The intermediate strengthening layer 16 may also incorporate optional additives. Such additives may include but are not limited to a water proofing agent, silica sand to enhance the ornamental appearance of the product and reinforcing fibers to increase the strength of the product. The reinforcing fibers may be selected from a group of materials consisting of glass fibers (preferably AR glass), metal fibers, carbon fibers, natural fibers, polymer fibers (such as polyester, polypropylene, nylon, PVA or other polymer fibers), and combinations thereof. Further, the intermediate strengthening layer may include a waterproofing agent, for example as disclosed in U.S. Pat. No. 3,563,786, which is incorporated herein by reference in its entirety. Such a waterproofing agent may be selected from a group of materials comprising calcium stearate, magnesium stearate, aluminum staearate, calcium myristate, calcium palmitate and calcium laurate or any other known waterproofing agent and combinations thereof.

The intermediate strengthening layer 16 has a viscosity prior to cure of between about 2,300 and about 4,800 centipoise using a #4 Brookfield viscometer.

The concrete substrate layer 18 typically includes a material selected from a group consisting of white cement, gray cement and combinations thereof. The method of making the concrete product 10 will now be described in detail. The method includes providing an ornamental surface layer 14 by painting a pigmented slurry precursor on/in a product mold M. This may be done by spraying or brushing. Next is the adding of the strengthening layer 16 to the ornamental surface layer 14 in the mold M. Typically, this is done by spraying. This is followed by adding the concrete substrate layer 18 to the ornamental surface layer 14 and the strengthening layer 16 in the mold M. The next step involves allowing the three layers 14, 16 and 18 to cure and set. This is followed by removing the product 10 from the mold M.

Figure 1:
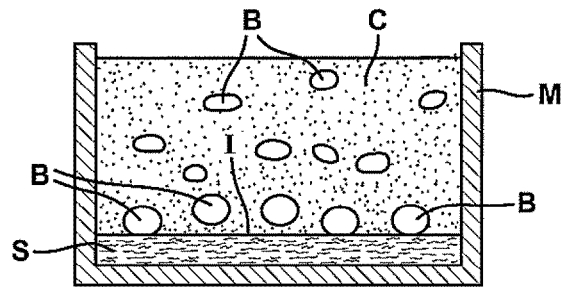
FIG. 1 is a schematical side elevational view illustrating how air bubbles may become trapped along the interface of the pigmented slurry layer and concrete layer in prior art methods of producing concrete products.
Figure 2:
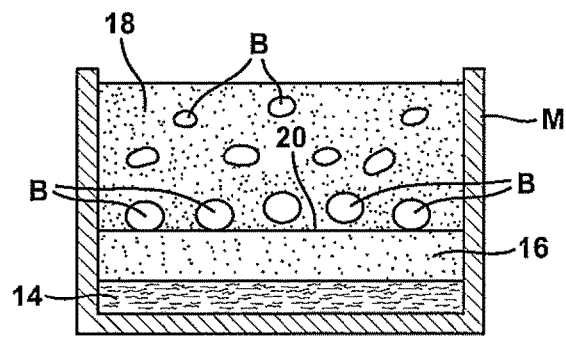
FIG. 2 illustrates the concrete product of the present invention wherein the intermediate strengthening layer acts as a buffer between the air bubbles trapped at the interface between the intermediate strengthening layer and the concrete substrate layer and the ornamental surface layer.

As the concrete substrate layer 18 is added to the mold M, some air bubbles B are trapped under the added concrete (See FIG. 2). Any large air bubbles B remaining in the product 10 after vibration are typically above the interface 20 between the intermediate strengthening layer 16 and the concrete substrate layer 18. Significantly, there are no air bubbles B adjacent the ornamental facing layer 14 or along the interface 22 between the ornamental facing layer 14 and the intermediate strengthening layer 16. In effect, the intermediate strengthening layer 16 acts as a buffer between the ornamental facing layer 14 and any air bubbles B that might possibly remain in the concrete product 10 following vibration of materials into the mold and the setting of a product. Together, the ornamental surface layer 14 and intermediate strengthening layer 16 provide a relatively thick, bubbleless cross section that is more robust and better resists stress on demolding.

Since, the resulting concrete product 10 does not include air bubble holes along the surface thereof, it has a more natural appearance. The absence of holes may also help inhibit the ability of water and ice to penetrate the product and induce spalling. The reduction or elimination of holes also tends to improve the strength and hardness of the ornamental facing layer 14. Thus, the concrete product 10 resists damage at all times including during removal from the mold, during packing, during shipping, during installation) during handling of any type and following installation.

The present invention also provides a number of benefits during manufacturing. Specifically, it enables the use of cheaper raw materials for the concrete substrate layer 18. Accordingly, gray cement may be utilized instead of white cement if desired. This is possible because the aesthetics of the product 10 are captured in the functionally graded ornamental facing layer 14 and intermediate strengthening layer 16 and, therefore, it is not necessary to provide aesthetics to the concrete substrate layer 18. In addition, the presence of the intermediate strengthening layer 16 allows the use of stiffer concrete for the concrete substrate layer 18. The use of stiffer concrete generally results in sharper 90-degree corners for the product in accordance with manufacturer desires.

The following example is presented to further illustrate the invention, but it is not to be considered as limited thereto.

The foregoing description of a preferred embodiment of the present invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A concrete product, comprising a body including:
   an ornamental facing layer having a bubbleless cross section;
   an intermediate strengthening layer in contact with the ornamental facing layer, the intermediate strengthening layer having a bubbleless cross section; and
   a concrete substrate layer in contact with the intermediate strengthening layer, the concrete substrate layer including a plurality of trapped air bubbles;
   wherein the intermediate strengthening layer is configured as a buffer between the ornamental facing layer and the plurality of trapped air bubbles in the concrete substrate layer.

2. The concrete product of claim 1, wherein said ornamental facing layer and said intermediate strengthening layer include a pigmenting agent.

3. The concrete product of claim 2, wherein said concrete substrate layer includes gray cement.

4. The concrete product of claim 1, wherein said intermediate strengthening layer includes a cementitious material, a pigmenting agent and a water reducer admixture.

5. The concrete product of claim 4, wherein said intermediate strengthening layer has a viscosity of between about 2,300 and about 4,800 centipoise using a #4 Brookfield viscometer.

6. The concrete product of claim 4, wherein said cementitious material is selected from a group of materials consisting of white cement, gray cement, fly ash and combinations thereof.

7. The concrete product of claim 4, wherein said pigmenting agent is selected from a group of materials consisting of manganese oxide, iron oxides, iron hydroxides, carbon, titanium dioxide, chromium oxide, zinc oxides, nickel rutiles, chromium rutiles, cobalt, copper, barium sulphate, barium manganate, and combinations thereof.

8. The concrete product of claim 4, wherein said water reducing admixture incorporates a hydroxylated carboxylic acid and a polycarboxylate plasticizer.

9. The concrete product of claim 4, wherein said ornamental facing layer includes cement, a pigmenting agent and a polymeric binder.

10. The concrete product of claim 9, wherein said pigmenting agent is selected from a group of materials consisting of manganese oxide, iron oxides, iron hydroxides, carbon, titanium dioxide, chromium oxide, zinc oxides, nickel rutiles, chromium rutiles, cobalt, copper, barium sulphate, barium manganate, and combinations thereof.

11. The concrete product of claim 9, wherein said polymeric binder is selected from a group of materials consisting of alkyl benzene sulphonates, alkyl naphthalene sulphonates, lignin sulphonate, sulphated polyglycol ethers, melamine formaldehyde condensates, naphthalene formaldehyde condensates, gluconic acid, salts of low molecular weight, partially esterified styrene-maleic anhydride copolymers and copolymers of vinyl acetate, crotonic acid, and combinations thereof.

12. The concrete product of claim 4, wherein said concrete substrate layer includes a material selected from a group consisting of white cement, gray cement and combinations thereof.

13. The concrete product of claim 4, wherein said intermediate strengthening layer includes a waterproofing agent.

14. The concrete product of claim 13, wherein said waterproofing agent is selected from a group of materials consisting of calcium stearate, magnesium stearate, aluminum, stearate, calcium myristate, calcium palmitate, calcium laurate and combinations thereof.

15. The concrete product of claim 4, wherein said intermediate strengthening agent includes a material selected from a group consisting of silica sand, reinforcing fibers and combinations thereof.

16. The concrete product of claim 15, wherein said reinforcing fibers are selected from a group of materials consisting of glass fibers, AR glass fibers, metal fibers, carbon fibers, natural fibers, polymer fibers, polyester fibers, polypropylene fibers, nylon fibers, PVA fibers, and combinations thereof.

17. A method of making a concrete product of claim 1, comprising:
   providing an ornamental surface layer in a product mold;
   adding a strengthening layer to said ornamental surface layer in said mold;
   adding a concrete substrate layer to said ornamental surface layer and said strengthening layer in said mold;
   allowing said ornamental surface layer, said strengthening layer and said concrete substrate layer to cure; and
   removing said product from said mold.

18. The concrete product of claim 1, wherein the ornamental facing layer includes a pigmenting agent and the intermediate strengthening layer includes a pigmenting agent, wherein the pigmenting agent used in the intermediate strengthening layer matches the pigmenting agent used in the ornamental facing layer.

* * * * *